March 10, 1931.  W. O. DAY ET AL  1,796,087
FLEXIBLE COUPLER FOR TRAILERS
Filed May 6, 1930  2 Sheets-Sheet 1
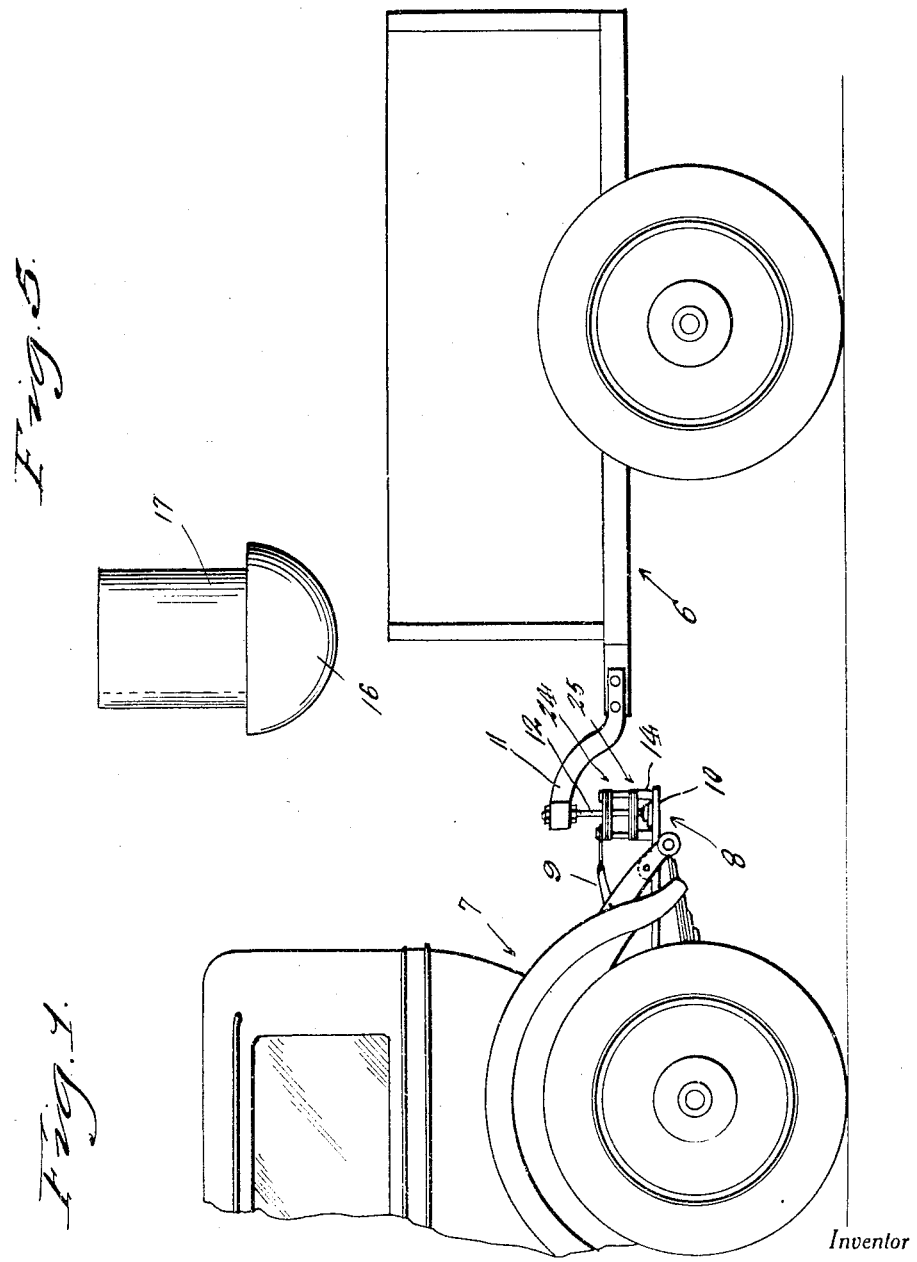
Inventor
W. O. Day
F. S. Martin
By Clarence A. O'Brien
Attorney March 10, 1931.  W. O. DAY ET AL  1,796,087
FLEXIBLE COUPLER FOR TRAILERS
Filed May 6, 1930  2 Sheets-Sheet 2
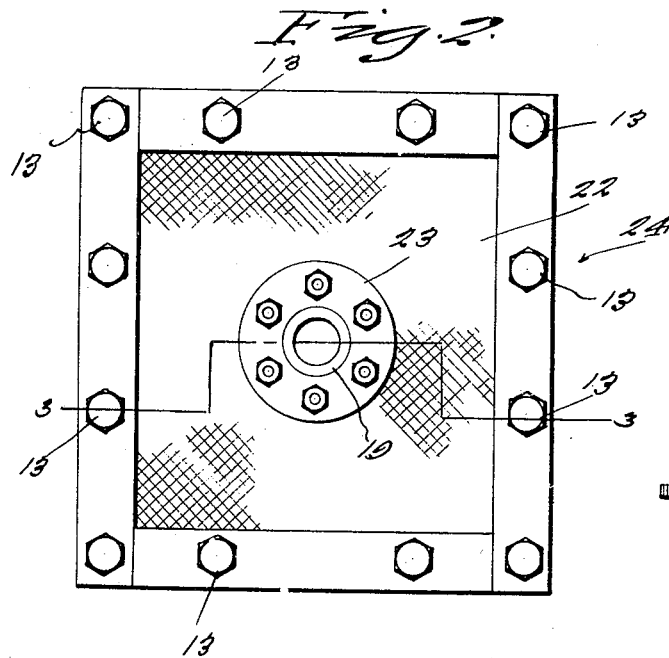
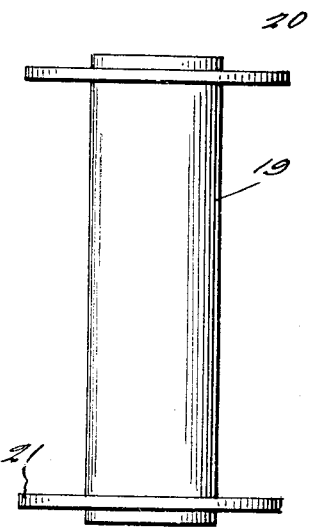
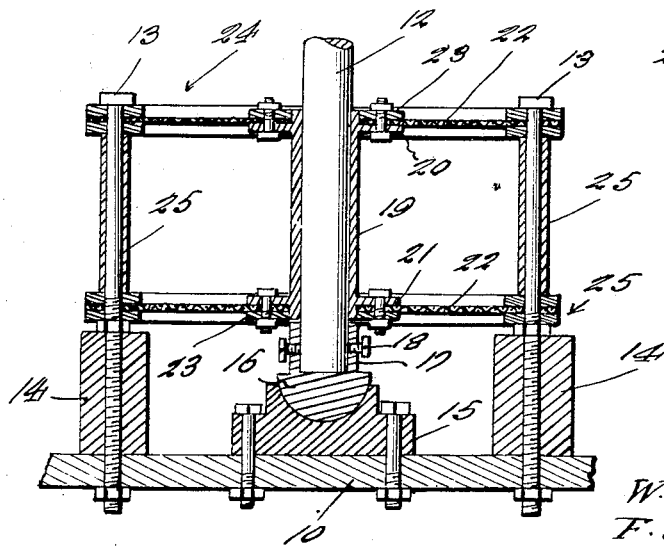
Inventor
W. O. Day
F. S. Martin
By Clarence A. O'Brien
Attorney Patented Mar. 10, 1931

1,796,087

UNITED STATES PATENT OFFICE

WILLIAM O. DAY, OF OPA LOCKA, AND FRANCIS S. MARTIN, OF CORAL GABLES, FLORIDA

FLEXIBLE COUPLER FOR TRAILERS

Application filed May 6, 1930. Serial No. 450,171.

This invention relates to an improved coupler for operatively connecting a trailer of any suitable type, with a lead vehicle such as for instance, a motor car or the like.

In carrying the inventive conception into practice, we have developed a coupler which is characterized by shock-absorbing and flexible properties as well as dependability and rigidity in construction, whereby to insure an effective and requisite connection between the two wheeled structures and to compensate for relative movement therebetween and at the same time to provide a positive draft.

The specific details constituting the structural novelty will become more readily apparent from the following description and drawings.

In the drawings:

Figure 1 is a diagrammatic side elevational view showing the two vehicles and the coupler therebetween.

Figure 2 is a top plan view of the coupler per se.

Figure 3 is a horizontal section on the line 3—3 of Figure 2 with the king pin in place.

Figure 4 is an elevational view of one of the details.

Figure 5 is a detail view of another of the parts.

Referring now to the drawings in detail, and especially to Figure 1, it will be seen that the numeral 6 designates the trailer which may be of any appropriate form, whereas the numeral 7 represents the general lead or motive power vehicle. This is here shown in the form of an automobile.

In accordance with the present invention, suitable attaching devices are provided for the coupler, said coupler being generally represented by the numeral 8. The major part of the coupler is supported from the vehicle 7 through the medium of connecting devices. For example, the numeral 9 designates attaching braces whereas the numeral 10 represents a relatively fixed base plate.

The trailer is provided with a connecting yoke or the like 11 having a depending king pin 12 which is connected with the coupler.

Referring to Figure 3 it will be observed that the numerals 13 designate upstanding attaching bolts which are threaded through wooden supporting blocks 14 on the base plate. These bolts are arranged to accommodate the coupler which is here shown as generally rectangular in configuration.

The numeral 15 represents a composition rest or fulcrum block having a semispherical socket forming a bearing. This is adapted to receive the correspondingly shaped head 16 on the collar unit 17. This forms somewhat of a universal connection.

The king pin 12 extends down to and is seated in this collar and fastened thereto by set screws 18. In addition the king pin extends through a connecting sleeve 19. This sleeve has outstanding flanges 20 and 21. These flanges are connected with flexible webs or diaphragms 22 through the medium of clamping rings 23. The marginal portions of the diaphragms are fastened between the complemental members forming the mounting frames 24 and 25 respectively. The frames are held in place by the aforesaid bolts 13.

The frames are spaced in vertically spaced parallelism through the medium of spacing sleeves 25 which surround the bolt. Thus, we have a multiple frame structure bolted to the base plate and including the flexible diaphragms or webs these having connections with a vertical sleeve 19 and the sleeve constituting a receptacle for a portion of the king bolt or pin 12. The pin extends down into the socket or collar 17 and is fastened thereto and the collar engages the lower end of the sleeve 19. The details of this arrangement co-act in forming a flexible coupler between the yoke 11 and the attaching means carried by the lead vehicle 7.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

We claim:

1. In a flexible trailer coupler of the class described, a base plate, frames bolted thereto, a vertical guide, flexible diaphragms connecting said guides to said frames, a king pin mounted in said guide, means connecting said pin with a trailer, and a universal end thrust bearing interposed between the base plate and lower end of the king pin.

2. In a coupler of the class described a base plate, upper and lower spaced parallel frames, bolts connecting said frames with the base plate, a vertical guide tube, a king pin arranged therein, flexible diaphragms fastened to said tube and fastened around their marginal edges to said frame, a socket member fastened to said base plate, a collar fastened to said king pin and including a semispherical head rockably mounted in said socket, said collar being located for co-operation with the adjacent end of said tube.

3. In a structure of the class described, in combination, a relatively rigid support, a plurality of upstanding bolts fastened thereon, upper and lower frames connected to said bolts in vertically spaced parallelism, flexible diaphragms clamped in said frames and disposed in spaced parallelism, a flanged sleeve interposed between said diaphragms at the central portions thereof, means clamping the flanged ends of the sleeve to the adjacent central portions of the diaphragms, said sleeve being adapted to accommodate a king pin.

4. In a structure of the class described, in combination, a relatively rigid support, a plurality of upstanding bolts fastened thereon, upper and lower frames connected to said bolts in vertically spaced parallelism, flexible diaphragms clamped in said frames and disposed in spaced parallelism, a flanged sleeve interposed between said diaphragms at the central portions thereof, means clamping the flanged ends of the sleeve to the adjacent central portions of the diaphragms, said sleeve being adapted to accommodate a king pin, a fulcrum block secured on said support and provided at its upper ends with a semispherical socket, a collar attached to the lower end of the king pin and provided with a semispherical head mounted for rocking motion in said socket.

In testimony whereof we affix our signatures.

WILLIAM O. DAY.
FRANCIS S. MARTIN.